United States Patent
Cribbs

(10) Patent No.: US 6,194,527 B1
(45) Date of Patent: Feb. 27, 2001

(54) PROCESS FOR MAKING POLYOLEFINS

(75) Inventor: Leonard V. Cribbs, Hamilton, OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 09/401,133

(22) Filed: Sep. 22, 1999

(51) Int. Cl.[7] .................. C08F 4/44; C08F 2/04
(52) U.S. Cl. ............... 526/75; 526/89; 526/160; 526/161; 526/943; 526/133; 526/134; 526/348.6; 526/352; 526/904; 502/152; 502/202
(58) Field of Search .................. 526/160, 161, 526/943, 133, 134, 348.6, 352, 75, 89

(56) References Cited

U.S. PATENT DOCUMENTS

| | | | |
|---|---|---|---|
| 4,752,597 | 6/1988 | Turner | 502/104 |
| 4,791,180 | 12/1988 | Turner | 526/160 |
| 4,923,833 | 5/1990 | Kioka et al. | 502/9 |
| 5,153,157 | 10/1992 | Hlatky et al. | 502/117 |
| 5,198,401 | 3/1993 | Turner et al. | 502/155 |
| 5,241,025 | 8/1993 | Hlatky et al. | 526/129 |
| 5,283,300 * | 2/1994 | Haspeslagh et al. | 526/75 |
| 5,308,811 | 5/1994 | Suga et al. | 502/62 |
| 5,539,124 | 7/1996 | Etherton et al. | 548/402 |
| 5,554,775 | 9/1996 | Krishnamurti et al. | 556/7 |
| 5,637,660 | 6/1997 | Nagy et al. | 526/160 |
| 5,902,866 | 5/1999 | Nagy et al. | 526/133 |
| 6,096,841 * | 8/2000 | Saccheti et al. | 526/75 |
| 6,124,230 * | 9/2000 | Speca et al. | 502/111 |
| 6,147,174 * | 11/2000 | Holtcamp et al. | 526/160 |

* cited by examiner

Primary Examiner—David W. Wu
Assistant Examiner—R. Harlan
(74) Attorney, Agent, or Firm—Jonathan L. Schuchardt

(57) ABSTRACT

A two-step olefin polymerization process is disclosed. A single-site catalyst precursor reacts with a boron-containing activator and a first olefin substantially in the absence of an alumoxane to produce a stable, prepolymer complex, which is then used to polymerize a second olefin in the presence of a scavenging amount of an alumoxane. The process gives high molecular weight polyolefins with low residual aluminum contents. Boron-containing activators can be used, even at reaction temperatures greater than 100° C., while maintaining high catalyst activity.

19 Claims, No Drawings

PROCESS FOR MAKING POLYOLEFINS

FIELD OF THE INVENTION

The invention relates to a process for making polyolefins. In particular, the invention provides an efficient way to make polyolefins with high molecular weights and low residual aluminum contents using single-site catalysts.

BACKGROUND OF THE INVENTION

Interest in single-site (metallocene and non-metallocene) catalysts continues to grow rapidly in the polyolefin industry. These catalysts are more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes include cyclopentadienyl, indenyl, or fluorenyl groups, which may contain other substituents or bridging groups. More recently, single-site catalysts in which a heteroatomic ring ligand replaces a cyclopentadienyl group have appeared, including boraaryl (see, e.g., U.S. Pat. No. 5,554,775), pyrrolyl (U.S. Pat. No. 5,539,124), and azaborolinyl groups (U.S. Pat. No. 5,902,866).

Many single-site catalysts require high levels of an alumoxane activator (e.g., polymethalumoxane). When used at such high concentrations, alumoxanes cause chain-transfer reactions that undesirably limit polyolefin molecular weight. In addition, high residual aluminum in the polymer adversely impacts mechanical properties, so the polyolefin product is normally treated after manufacture to remove it.

Boron compounds such as triphenylcarbenium tetrakis(pentafluorophenyl)borate or tris(pentafluorophenyl)borane can be used instead of alumoxanes to activate some single-site catalysts. Unfortunately, however, these catalyst systems are usually less active and less stable than alumoxane-activated catalysts. Because boron-containing activators eliminate the need for high levels of alumoxanes, it would be valuable to develop a process that retains this advantage, yet overcomes the activity and stability issues.

Single-site catalysts also generally lack thermal stability compared with Ziegler-Natta catalysts. Olefin polymerizations catalyzed by single-site catalysts are normally performed at relatively low reaction temperatures (less than about 100° C.) to prolong catalyst lifetime. Higher reaction temperatures would ordinarily be desirable, however, because polymerization rates generally escalate with increasing temperature. Thus, a process that enhances the thermal stability of single-site catalysts and allows higher reaction temperatures to be used would be valuable.

Prepolymerization of a small proportion of olefin with single-site catalysts and alumoxane activators to make prepolymer complexes is known. For example, U.S. Pat. No. 4,923,833 teaches to prepolymerize a portion of ethylene with bis(cyclopentadienyl)zirconium dichloride and an activating amount of methalumoxane, followed by addition of the prepolymer complex to a second reactor that is used for the main polymerization. U.S. Pat. No. 5,308,811 similarly teaches to use a prepolymerization technique with an alumoxane-activated single-site catalyst (see column 11 and Examples 23–26). Neither reference explains why prepolymerization is used, and neither suggests making the prepolymer complex substantially in the absence of an alumoxane or in the presence of a boron-containing compound.

An improved process for making polyolefins with single-site catalysts is needed. In particular, a process that gives products with low residual aluminum is required. A preferred process would avoid chain-transfer reactions and allow the production of high-molecular-weight polymers. A valuable process would use a boron-activated catalyst with both high activity and good stability. Ideally, the polymerization process could be performed at relatively high reaction temperatures without significantly deactivating the catalyst.

SUMMARY OF THE INVENTION

The invention is a two-step process for making a polyolefin. First, a single-site catalyst precursor reacts with a boron-containing activator and a first olefin substantially in the absence of an alumoxane to produce a stable, prepolymer complex. The prepolymer complex is then used as a catalyst to polymerize a second olefin in the presence of a scavenging amount of an alumoxane to produce a polyolefin.

The process of the invention is easy to practice and affords high-molecular-weight polyolefins with low residual aluminum contents. Surprisingly, boron-containing activators can be used—and high levels of alumoxanes can be avoided—while retaining high catalyst activity. Moreover, the process can be performed at temperatures greater than 100° C. while maintaining good catalyst activity.

DETAILED DESCRIPTION OF THE INVENTION

In the first step of the process of the invention, a single-site catalyst precursor reacts with a boron-containing activator and a first olefin to give a stable, prepolymer complex.

Single-site catalyst precursors are organometallic complexes that can be converted to active olefin polymerization catalysts, usually by contacting them with a suitable activator. "Single-site" catalysts are distinct chemical species rather than mixtures of different species. They typically give polyolefins with characteristically narrow molecular weight distributions (Mw/Mn<3) and good, uniform comonomer incorporation.

Single-site catalyst precursors useful in the invention include a transition or lanthanide metal, M, preferably from Group 3 to Group 10 of the Periodic Table. More preferred catalyst precursors include a Group 4 to 6 transition metal; most preferably, the precursor contains a Group 4 metal such as titanium or zirconium.

The single-site catalyst precursor preferably includes one or more polymerization-stable, anionic ligands. Examples include substituted and unsubstituted cyclopentadienyl, fluorenyl, and indenyl, or the like, such as those described in U.S. Pat. Nos. 4,791,180 and 4,752,597, the teachings of which are incorporated herein by reference. A preferred group of polymerization-stable ligands are heteroatomic ligands such as boraaryl, pyrrolyl, indolyl, quinolinyl, pyridinyl, and azaborolinyl as described in U.S. Pat. Nos. 5,554,775, 5,539,124, 5,637,660, and 5,902,866, the teachings of which are incorporated herein by reference. The catalyst precursor also usually includes one or more labile ligands such as halides, alkyls, alkaryls, aryls, dialkylaminos, or the like. Particularly preferred are halides, alkyls, and alkaryls (e.g., chloride, methyl, benzyl).

The polymerization-stable ligands can be bridged. Groups that can be used to bridge the ligands include, for example, methylene, ethylene, 1,2-phenylene, and dialkyl silyls. Normally, only a single bridge is included. Bridging changes the geometry around the transition or lanthanide metal and can improve catalyst activity and other properties such as comonomer incorporation.

Exemplary catalyst precursors: bis(cyclopentadienyl) zirconium dimethyl, bis(cyclopentadienyl)zirconium dichloride, bis(indenyl)titanium dibenzyl, bis(fluorenyl) zirconium dimethyl, 8-quinolinoxy(cyclopentadienyl) titanium dimethyl, bis(2-pyridinoxy)titanium diethyl, (1-dimethylaminoborabenzene)cyclopentadienylzirconium dichloride, bis(1-methylborabenzene)zirconium dimethyl, bis(indolyl)zirconium dimethyl, and the like.

A boron-containing activator ionizes the catalyst precursor to produce an active polymerization catalyst. Preferred activators are organoboranes, which include boron and one or more alkyl, aryl, or aralkyl groups. Particularly preferred activators incorporate perfluoroaryl groups. Suitable activators include substituted and unsubstituted trialkyl and triarylboranes such as tris(pentafluorophenyl)borane, triphenylborane, tri-n-octylborane, and the like. Tris (pentafluorophenyl)borane is especially preferred. Suitable activators also include ionic borates in which a boron is bonded to four alkyl, aryl, or aralkyl groups, most preferably four perfluorinated aryl groups. Examples include N,N-dimethylanilinium tetrakis(pentafluorophenyl)borate and trityl tetrakis-(pentafluorophenyl)borate. These and other suitable boron-containing activators are described in U.S. Pat. Nos. 5,153,157, 5,198,401, and 5,241,025, the teachings of which are incorporated herein by reference.

The molar ratio of boron in the activator to the transition or lanthanide metal in the catalyst precursor depends on a number of factors, including the structures of the activator and precursor, the operating conditions, the desired polymer properties, and other factors. Usually, however, the molar ratio will be within the range of about 0.1 to about 20, more preferably from about 1 to about 10 moles of boron per mole of M when an ionic borate or a trialkyl or triarylborane is used.

In the first step of the process—a "prepolymerization" step—the catalyst precursor and boron-containing activator react in the presence of a first olefin, and in the absence of an alumoxane, to produce a stable, prepolymer complex. "Stable" means that the prepolymer complex maintains good activity for a time sufficient to polymerize the second olefin in the next step. The prepolymer complex is believed to result from addition of a cationic transition metal species to the first olefin, followed by chain growth from oligomerization of more olefin molecules. The prepolymerization reaction step is conveniently performed at room temperature, although any desired temperature can be used.

Suitable first olefins contain a polymerizable carbon—carbon double bond. Preferred first olefins are ethylene and $C_3$–$C_{20}$ α-olefins such as propylene, 1-butene, 1-hexene, 1-octene, styrene, and the like, and mixtures thereof. The first olefin is used in an amount sufficient to impart stability to the resulting prepolymer complex. While the amount of first olefin can vary, it is preferred to use an amount within the range of about 500 to about 50,000 moles of olefin per mole of M, more preferably from about 1000 to about 25,000 moles of olefin per mole of M. Prepolymerization prolongs the lifetime of the active polymerization catalyst.

Prepolymerization also imparts significant thermal stability to the catalyst. As Example 10 shows, acceptable catalyst activity is maintained even at 130° C. Single-site catalysts are normally limited to relatively mild reaction temperatures (i.e., less than about 100° C.). I surprisingly found that prepolymerization makes the single-site catalyst, once activated, unusually robust.

I also found that it is important to make the prepolymer complex substantially in the absence of an alumoxane. "Substantially in the absence" means an amount of alumoxane that is insufficient to cause a significant drop in either catalyst activity or stability of the prepolymer complex. Preferably, the aluminum to transition metal (M) mole ratio used in the first step of the process is less than about 100:1, more preferably less than about 10:1, and most preferably less than 1:1.

When alumoxanes are included in the prepolymer complex, catalyst activity is reduced. As Table 1 shows, the best catalyst activities result when the catalyst is made in the absence of an alumoxane (see Examples 1–10). There are other important factors, however. As Examples C13 and C14 show, leaving out the alumoxane does not guarantee that polyethylene will be obtained. Moreover, the alumoxane as a catalyst component merely reduces activity (see Comparative Examples C11, C12, C17, and C18). The process of the invention, by making the catalyst precursor substantially in the absence of the alumoxane, avoids another pitfall: the need to remove high levels of aluminum from the polyolefin (see Background).

In step two of the process, a second olefin, which may be the same as the first olefin, is polymerized in the presence of the prepolymer complex and a scavenging amount of an alumoxane to produce a polyolefin. The reaction is preferably performed at a temperature within the range of about 20 to about 180° C., more preferably from about 60 to about 130° C.

Suitable second olefins are those described above. They preferably include ethylene, propylene, and mixtures thereof with other α-olefins such as 1-butene, 1-hexene, 1-octene, and the like. Ethylene and propylene are particularly preferred.

A comonomer is optionally included. Comonomers are advantageously used to produce low-density polyolefins such as LLDPE. Preferred comonomers include α-olefins (1-butene, 1-hexene, 1-octene), diolefins, norbornenes, and the like. When a comonomer is used, it is typically present in an amount within the range of about 1 to about 30 mole % based on the total amount of polymerizable monomers.

A reaction solvent is optionally used. Preferred solvents are aliphatic and aromatic hydrocarbons, such as hexane, heptane, octane, isooctane, toluene, xylenes, and the like. The solvent is preferably dry and substantially free of oxygen.

The process of the invention incorporates comonomers well. See Table 2 (Examples 1–10) below, which shows densities of about 0.93–0.94 g/mL for polyethylenes made with 1-butene as a comonomer. In contrast, see C11, which omits the borane activator, makes the catalyst with PMAO as a catalyst component, and does not use PMAO as a scavenger in step 2. In C11, the product density—with 1-butene added—is 0.965, which indicates poor comonomer incorporation.

A scavenging amount of an alumoxane is included in the reactor when the second olefin is polymerized according to the process of the invention. "Scavenging amount" means an amount sufficient to react with water, oxygen, or other trace impurities that would otherwise poison or inhibit the activity of the prepolymer complex. A scavenging amount is much less than the amount commonly used to activate metallocene or non-metallocene single-site catalysts. For example, it is common to use 1000 or more moles of aluminum per mole of transition or lanthanide metal to activate a metallocene catalyst. In contrast, a scavenging amount is preferably an amount of alumoxane within the range of about 1 to about 800, more preferably from about 10 to about 500, and most preferably from about 100 to about 400 moles of aluminum per mole of M.

The use of a scavenging amount of alumoxane is important. As Table 1 below shows, the examples with the highest activity all use a scavenging amount of an alumoxane in the reactor in the second step of the process. In contrast, when a scavenging amount of an alumoxane is not used, catalyst activity is low (see examples C11, C12, C17, C18) or zero (C13–C16).

Suitable alumoxanes are well known. They preferably include polymeric aluminum compounds represented by the cyclic formula $(R—Al—O)_s$ or the linear formula $R(R—Al—O)_sAlR$ wherein R is a $C_1$–$C_5$ alkyl group and s has a value from 1 to 20. Preferably, R is methyl and s has a value from 4 to 10. Examples are methalumoxane, polymethalumoxane (PMAO), ethylalumoxane, and diisobutylalumoxane.

If desired, a catalyst support such as silica or alumina can be used. However, the use of a support is generally not necessary for practicing the process of the invention.

A variety of types of processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The following examples merely illustrate the invention. Those skilled in the art will recognize many variations that are within the spirit of the invention and scope of the claims.

EXAMPLE 1

Ethylene Polymerization

A 1.7-L reactor is conditioned by heating to 130° C. and holding at that temperature for 30 min. under a nitrogen purge. Meanwhile, a prepolymer complex is made separately in a glove box under nitrogen as follows. Bis(cyclopentadienyl)zirconium dimethyl (1.0 mL of 0.0039 M solution in toluene, $3.9 \times 10^{-3}$ mmol Zr) is combined in a round-bottom flask with tris(pentafluorophenyl)borane (0.30 mL of 0.044 M boron solution in toluene, 0.013 mmol boron) and 1-hexene (2.0 mL) in toluene (6.7 mL), and the mixture is stirred at room temperature for several minutes to generate a prepolymer complex. The prepolymer complex is then transferred by nitrogen to a stainless-steel vessel.

Hexane (850 mL) and a scavenging amount of polymethalumoxane (0.50 mL of 2.67 M aluminum solution in hexane, 1.33 mmol Al) are added to the 1.7-L reactor, which is sealed and heated to 80° C. The reactor is then charged with ethylene to 150 psi, and 1-butene (10 mL) is added as a comonomer.

The prepolymer complex is transferred by nitrogen pressure into the reactor, and the polymerization begins. Ethylene is fed on demand via a pressure regulator to maintain 150 psi in the reactor. The reaction temperature is kept at 80° C. by external heating or cooling.

The polymerization is terminated after 60 min. by venting the reactor, and the polymer is isolated by filtration. BHT (1000 ppm) is added, and volatiles are removed by heating under vacuum at 80° C. for 2 h. Melt flow properties are measured using ASTM D-1238. Densities are measured in a density gradient column using ASTM D-1505 85. Table 1 summarizes process conditions and Table 2 gives polymer properties for the examples.

EXAMPLE 2

The procedure of Example 1 is followed, except that 0.25 mL (0.67 mmol Al) of polymethalumoxane is used as a scavenger.

EXAMPLE 3

The procedure of Example 1 is followed, except that 1-octene (2.0 mL) is used instead of 1-hexene in making the prepolymer complex.

EXAMPLE 4

The procedure of Example 1 is followed using 15 mL of 1-butene as a comonomer.

EXAMPLE 5

The procedure of Example 1 is followed using 20 mL of 1-butene as a comonomer.

EXAMPLE 6

The procedure of Example 1 is followed with the following changes: Toluene (850 mL) is used instead of hexane as the reaction solvent. Three mL of bis(cyclopentadienyl) zirconium dimethyl solution ($11.9 \times 10^{-3}$ mmol Zr), 1.0 mL of borane activator solution (0.044 mmol boron), 2.0 mL of hexene, and 4.0 mL of toluene are used to make the prepolymer complex. The amount of polymethalumoxane scavenger is 1.25 mL (3.34 mmol Al). Polymerization time: 15 min.

EXAMPLE 7

The procedure of Example 1 is followed with the following changes: Bis(indenyl)zirconium dimethyl (0.25 mL of 0.003 M solution, $0.71 \times 10^{-3}$ mmol Zr), 0.1 mL (0.0044 mmol boron) of borane activator, 2.0 mL of 1-hexene, and 7.25 mL of toluene are used to make the prepolymer complex. The amount of polymethalumoxane scavenger is 0.10 mL (0.27 mmol Al).

EXAMPLE 8

The procedure of Example 7 is repeated except that hydrogen ($\Delta$=5 psi) is included with the ethylene charge, and the polymerization is stopped after 30 min.

EXAMPLE 9

The procedure of Example 7 is repeated except that the reaction temperature is 70° C.

EXAMPLE 10

The procedure of Example 7 is repeated except that the reaction temperature is 130° C. This example shows that the process can be used at a relatively high reaction temperature while maintaining adequate catalyst activity (127 kg polyethylene per gram Zr per hour).

COMPARATIVE EXAMPLES 11 and 12

These examples show the impact of using polymethalumoxane as part of the catalyst while omitting prepolymerization and the borane activator.

COMPARATIVE EXAMPLE 11

A 1.7-L reactor is conditioned by heating to 130° C. and holding at that temperature for 30 min. under a nitrogen purge. Meanwhile, a metallocene complex is made separately in a glove box under nitrogen as follows. Bis(cyclopentadienyl)zirconium dimethyl (3.0 mL of 0.0039 M solution in toluene, $11.7 \times 10^{-3}$ mmol Zr) is combined in a round-bottom flask with polymethalumoxane (5.25 mL of 2.67 M aluminum solution in toluene, 1200 moles Al per mole of Zr) and toluene (1.75 mL), and the mixture is stirred at room temperature for several minutes. The catalyst solution is then transferred by nitrogen to a stainless-steel vessel.

Toluene (850 mL), but no additional PMAO, is added to the 1.7-L reactor, which is sealed and heated to 80° C. The reactor is then charged with ethylene to 150 psi, and 1-butene (10 mL) is added as a comonomer.

The catalyst solution is injected into the reactor, and the polymerization begins. Ethylene is fed on demand via a pressure regulator to maintain 150 psi in the reactor. The reaction temperature is kept at 80° C. by external heating or cooling.

The polymerization is terminated after 15 min. by venting the reactor, and the polymer is isolated by filtration. BHT (1000 ppm) is added, and volatiles are removed by heating under vacuum at 80° C. for 2 h.

As this example and the next one show, a large amount of an alumoxane is needed to give a catalyst with reasonably high activity. However, the catalyst activity is still significantly less than that of most of the preceding examples. In addition, the aluminum residues would need to be removed for many end uses.

COMPARATIVE EXAMPLE 12

The procedure of Comparative Example 11 is followed, except that the 1-butene comonomer is omitted.

COMPARATIVE EXAMPLE 13

The procedure of Comparative Example 11 is followed with the following changes. The catalyst is prepared in the absence of polymethalumoxane. In addition, a large amount of polymethalumoxane (5.0 mL of 2.67 M aluminum solution in toluene, 1120 moles Al per mole of Zr) is charged to the reactor with the 850 mL of toluene just prior to the ethylene charge, and no 1-butene comonomer is used. After 15 min. of reaction time, no polyethylene results.

This example shows that it is not sufficient to simply omit the alumoxane from the catalyst preparation or to add some to the polymerization reactor. It also underscores the importance of using a boron-containing activator and a prepolymerization technique.

COMPARATIVE EXAMPLE 14

A 1.7-L reactor is conditioned by heating to 130° C. and holding at that temperature for 30 min. under a nitrogen purge. Meanwhile, a metallocene complex is made separately in a glove box under nitrogen as follows. Bis(cyclopentadienyl)zirconium dimethyl (1.0 mL of 0.0039 M solution in toluene, $3.98 \times 10^{-3}$ mmol Zr) is combined in a round-bottom flask with tris(pentafluorophenyl)borane (0.30 mL of 0.044 M boron solution in toluene, 0.013 mmol boron) and toluene (8.7 mL), and the mixture is stirred at room temperature for several minutes. The catalyst solution is then transferred by nitrogen to a stainless-steel vessel.

Toluene (850 mL) is added to the 1.7-L reactor, which is sealed and heated to 80° C. The reactor is then charged with ethylene to 150 psi.

The catalyst solution is injected into the reactor. After 15 min. of run time, no polyethylene results. This example demonstrates that the presence of the boron-containing activator alone is not sufficient; prepolymerization and a scavenging amount of an alumoxane in the reactor are also needed.

COMPARATIVE EXAMPLE 15

The procedure of Comparative Example 14 is followed, except that the catalyst is prepared in the presence of polymethalumoxane. Thus, the catalyst is prepared by mixing bis(cyclopentadienyl)zirconium dimethyl, tris(pentafluorophenyl)borane, toluene (8.45 mL), and polymethalumoxane (0.25 mL of 2.67 M aluminum solution in toluene, 0.67 mmol Al) as described above.

The catalyst is injected into the 1.7-L reactor as described earlier, but after 15 min. of run time, no polyethylene results. This example shows the importance of adding a scavenging amount of an alumoxane to the reactor rather than using it as a catalyst component.

COMPARATIVE EXAMPLE 16

The procedure of Comparative Example 15 is generally followed, except that polymethalumoxane is used both as a catalyst component and as a scavenger in the reactor. Thus, the catalyst is prepared by combining bis(cyclopentadienyl)zirconium dimethyl (3.0 mL of 0.0039 M solution in toluene, $11.9 \times 10^{-3}$ mmol Zr) with tris(pentafluorophenyl)borane (0.85 mL of 0.044 M boron solution in toluene, 0.037 mmol boron), toluene (1.15 mL), and polymethalumoxane (5.0 mL of 0.053 M aluminum solution in toluene), and stirring the mixture for several minutes.

After charging the 1.7-L reactor with toluene and ethylene as described earlier, a scavenging amount of polymethalumoxane (0.50 mL of 2.67 M aluminum solution in toluene) is added. The catalyst mixture prepared above is then injected. 1-Butene (10 mL) is included as a comonomer.

After 15 min. of run time, no polyethylene results. This example shows that simply adding a scavenging amount of an alumoxane to the reactor, followed by a boron-activated catalyst, is not enough. It underscores the importance of using prepolymerization and of eliminating the alumoxane from the catalyst preparation.

COMPARATIVE EXAMPLE 17

The procedure of Comparative Example 15 is generally followed, except that 1-butene (10 mL) is included as a comonomer, and the amount of polymethalumoxane used to make the catalyst relative to the amount of borane compound is reduced. Thus, the catalyst is prepared by combining bis(cyclopentadienyl)zirconium dimethyl (6.0 mL of 0.0039 M solution in toluene, $23.4 \times 10^{-3}$ mmol Zr) with tris(pentafluorophenyl)borane (1.75 mL of 0.044 M boron solution in toluene, 0.077 mmol boron), toluene (1.25 mL), and polymethalumoxane (1.0 mL of 2.67 M aluminum solution in toluene), and stirring the mixture for several minutes.

Toluene (850 mL), but no additional PMAO, is added to the 1.7-L reactor, which is sealed and heated to 80° C. The reactor is then charged with ethylene to 150 psi, and 1-butene (10 mL) is added as a comonomer.

The catalyst solution is injected into the reactor, and the polymerization begins. Ethylene is fed on demand via a pressure regulator to maintain 150 psi in the reactor. The reaction temperature is kept at 80° C. by external heating or cooling.

The polymerization is terminated after 15 min. by venting the reactor, and the polymer is isolated by filtration. BHT (1000 ppm) is added, and volatiles are removed by heating under vacuum at 80° C. for 2 h.

The measured catalyst activity is about 55 kg polyethylene per gram Zr per hour (compared with 127 to 757 kg polyethylene per gram Zr for the process of the invention). This example and the next one show that an active catalyst can be made in the presence of an alumoxane, and that a scavenging amount of an alumoxane need not be added to the reactor for some activity. However, the low activity of these systems compared with that of the invention shows the value of minimizing the amount of alumoxane used as a catalyst component.

COMPARATIVE EXAMPLE 18

The procedure of Comparative Example 17 is followed, except that the amount of polymethalumoxane used to make the catalyst is reduced. Thus, the catalyst is prepared by combining bis(cyclopentadienyl)zirconium dimethyl with tris(pentafluorophenyl)borane, toluene (1.75 mL), and polymethalumoxane (0.5 mL of 2.67 M aluminum solution in toluene), and stirring the mixture for several minutes.

The measured catalyst activity is about 32 kg polyethylene per gram Zr per hour.

The preceding examples are meant only as illustrations. The following claims define the invention.

TABLE 2-continued

Summary of Polymer Properties

| Example | Melt index (MI) | High-load melt index (HLMI) | Melt-flow ratio (MFR) | Density (g/mL) |
|---|---|---|---|---|
| 8 | 14.1 | 488 | 34.7 | — |
| 9 | 0.03 | 0.68 | 21.4 | — |
| 10 | 66.8 | 1804 | 27.0 | — |
| C11 | 6.87 | 234 | 34.1 | 0.965 |
| C12 | 3.21 | 61 | 19.0 | 0.967 |

I claim:

1. A process which comprises:
   (a) reacting a single-site catalyst precursor with a boron-containing activator and a first olefin substantially in the absence of an alumoxane to produce a stable, prepolymer complex; and
   (b) polymerizing a second olefin in the presence of the prepolymer complex and a scavenging amount of an alumoxane to produce a polyolefin.
2. The process of claim 1 wherein the catalyst precursor is a Group 4 transition metal complex containing one or more cyclopentadienyl, indenyl, or fluorenyl groups.
3. The process of claim 1 wherein the catalyst precursor is selected from the group consisting of bis(cyclopentadienyl)-zirconium dimethyl and bis(indenyl)zirconium dimethyl.

TABLE 1

Summary of Process Conditions

| Example | Borane activator? | Catalyst made with PMAO | PMAO used as a scavenger? | Comonomer used? | Prepolymerization? | Activity (kg PE/g Zr-hr) |
|---|---|---|---|---|---|---|
| 1 | Yes | No | Yes | Yes | Yes | 189 |
| 2 | | | | | | 171 |
| 3 | | | | | | 161 |
| 4 | | | | | | 205 |
| 5 | | | | | | 539 |
| 6 | | | | | | 192 |
| 7 | | | | | | 757 |
| 8 | | | | | | 250 |
| 9 | | | | | | 744 |
| 10 | | | | | | 127 |
| C11 | No | Yes | No | Yes | No | 121 |
| C12 | No | Yes | No | No | | 95 |
| C13 | No | No | Yes | No | | 0 |
| C14 | Yes | No | No | No | | 0 |
| C15 | Yes | Yes | No | No | | 0 |
| C16 | Yes | Yes | Yes | Yes | | 0 |
| C17 | Yes | Yes | No | Yes | | 55 |
| C18 | Yes | Yes | No | Yes | | 32 |

TABLE 2

Summary of Polymer Properties

| Example | Melt index (MI) | High-load melt index (HLMI) | Melt-flow ratio (MFR) | Density (g/mL) |
|---|---|---|---|---|
| 1 | 0.90 | 36.7 | 40.9 | 0.938 |
| 2 | 0.17 | 10.6 | 61.3 | 0.937 |
| 3 | 0.28 | 22.4 | 80.9 | 0.939 |
| 4 | 1.43 | 50.2 | 35.2 | 0.936 |
| 5 | 6.80 | 144 | 21.2 | 0.935 |
| 6 | 0.93 | 17.1 | 18.4 | 0.932 |
| 7 | 0.08 | 2.15 | 28.7 | — |

4. The process of claim 1 wherein the catalyst precursor includes at least one polymerization-stable, heteroatomic ligand selected from the group consisting of boraaryl, pyridinyl, quinolinyl, azaborolinyl, pyrrolyl, indolyl, and mixtures thereof.
5. The process of claim 1 wherein the boron-containing activator is an organoborane or an ionic borate.
6. The process of claim 1 wherein the first olefin is selected from the group consisting of ethylene and $C_3$–$C_{20}$ α-olefins.
7. The process of claim 1 wherein the second olefin is selected from the group consisting of ethylene and $C_3$–$C_{20}$ α-olefins.

8. The process of claim 1 performed in the presence of from about 1 to about 30 mole %, based on the total amount of polymerizable monomers, of a comonomer.

9. The process of claim 1 wherein step (a) is performed using an aluminum to transition metal (M) mole ratio less than about 100:1.

10. The process of claim 9 wherein step (a) is performed using an aluminum to transition metal (M) ratio less than about 10:1.

11. The process of claim 5 wherein the molar ratio of boron in the activator to M is within the range of about 0.1 to about 20.

12. The process of claim 1 wherein the molar ratio of first olefin to M used in step (a) is within the range of about 500 to about 50,000.

13. The process of claim 1 wherein the scavenging amount of alumoxane in step (b) equals from about 1 to about 800 moles of aluminum per mole of M.

14. The process of claim 1 wherein step (b) is performed at a temperature within the range of about 60° C. to about 130° C.

15. A process which comprises:
   (a) reacting a single-site catalyst precursor that includes at least one polymerization-stable, heteroatomic ligand selected from the group consisting of boraaryl, pyridinyl, quinolinyl, azaborolinyl, pyrrolyl, indolyl, and mixtures thereof, with a boron-containing activator and a first olefin substantially in the absence of an alumoxane to produce a stable, prepolymer complex; and
   (b) polymerizing a second olefin in the presence of the prepolymer complex and a scavenging amount of an alumoxane to produce a polyolefin.

16. The process of claim 15 performed in the presence of from about 1 to about 30 mole %, based on the amount of polymerizable monomers, of a comonomer.

17. The process of claim 15 wherein step (a) is performed using an aluminum to transition or lanthanide metal (M) mole ratio less than 100:1.

18. The process of claim 15 wherein the scavenging amount of alumoxane in step (b) equals from about 1 to about 800 moles of aluminum per mole of M.

19. A process which comprises:
   (a) reacting a single-site catalyst precursor that includes at least one polymerization-stable, heteroatomic ligand selected from the group consisting of boraaryl, pyridinyl, quinolinyl, azaborolinyl, pyrrolyl, indolyl, and mixtures thereof, with a boron-containing activator and ethylene or a $C_3$–$C_{20}$ α-olefin substantially in the absence of an alumoxane to produce a stable, prepolymer complex; and
   (b) polymerizing ethylene in the presence of the prepolymer complex and a scavenging amount of an alumoxane to produce polyethylene.

* * * * *